US009908558B2

(12) United States Patent
Popken et al.

(10) Patent No.: US 9,908,558 B2
(45) Date of Patent: Mar. 6, 2018

(54) METHOD AND DEVICE FOR STEERING A CAR/TRAILER COMBINATION INTO A PARKING SPACE

(71) Applicant: Audi AG, Ingolstadt (DE)

(72) Inventors: Markus Popken, Gaimersheim (DE); Michael Graeff, München (DE); Michael Luebcke, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/113,766

(22) PCT Filed: Dec. 17, 2014

(86) PCT No.: PCT/EP2014/003400
§ 371 (c)(1),
(2) Date: Jul. 22, 2016

(87) PCT Pub. No.: WO2015/110135
PCT Pub. Date: Jul. 30, 2015

(65) Prior Publication Data
US 2017/0008563 A1     Jan. 12, 2017

(30) Foreign Application Priority Data

Jan. 25, 2014    (DE) .................. 10 2014 000 978

(51) Int. Cl.
*B62D 15/02*     (2006.01)
*G06K 9/00*     (2006.01)
(Continued)

(52) U.S. Cl.
CPC ......... *B62D 15/0285* (2013.01); *B60W 30/06* (2013.01); *B62D 13/06* (2013.01);
(Continued)

(58) Field of Classification Search
CPC .. B62D 15/0285; B62D 13/06; B62D 15/021; B62D 15/0275; B62D 15/028;
(Continued)

(56) References Cited

U.S. PATENT DOCUMENTS 8,825,328 B2 * 9/2014 Rupp ..................... B62D 13/06
303/123
9,227,568 B1 * 1/2016 Hubbell ................. B60R 1/081
(Continued)

FOREIGN PATENT DOCUMENTS

DE     102005045196 A1    9/2006
DE     102005043466 A1    3/2007
(Continued)

OTHER PUBLICATIONS

English-language abstract of German Patent Appliction Publication No. 10 2010 008 324 A1, published Aug. 18, 2011; 1 page.
(Continued)

*Primary Examiner* — Tuan C To
(74) *Attorney, Agent, or Firm* — Sterne, Kessler, Goldstein & Fox, PLLC

(57) ABSTRACT

The present invention relates to a method for steering a car/trailer combination comprising a vehicle and at least one trailer, in which a mobile display unit is used for representing at least a part of the car/trailer combination and wherein the mobile display unit is in contact with the vehicle via a wireless connection and is used for monitoring the driving functions of the vehicle, and wherein at least one orientation aid is depicted on the mobile display unit. The present invention further relates to a corresponding device.

21 Claims, 3 Drawing Sheets

(51) Int. Cl.
  *G08G 1/16* (2006.01)
  *B60W 30/06* (2006.01)
  *G05D 1/00* (2006.01)
  *G05D 1/02* (2006.01)
  *B62D 13/06* (2006.01)
  *G06F 3/0484* (2013.01)
  *H04M 1/725* (2006.01)

(52) U.S. Cl.
  CPC ......... *B62D 15/021* (2013.01); *B62D 15/028* (2013.01); *B62D 15/0275* (2013.01); *G05D 1/0016* (2013.01); *G05D 1/0212* (2013.01); *G06K 9/00671* (2013.01); *G06K 9/00812* (2013.01); *G08G 1/168* (2013.01); *B60W 2300/14* (2013.01); *G06F 3/04842* (2013.01); *H04M 1/725* (2013.01)

(58) Field of Classification Search
  CPC .............. B60W 30/06; B60W 2300/14; G05D 1/0016; G05D 1/0212; G06K 9/00671; G06K 9/00812; G08G 1/168; G06F 3/04842; H04M 1/725
  See application file for complete search history.

(56) References Cited

U.S. PATENT DOCUMENTS

| | | | |
|---|---|---|---|
| 2005/0000738 A1 | 1/2005 | Gehring et al. | |
| 2005/0029864 A1* | 2/2005 | Bauer | B60T 7/12 303/191 |
| 2007/0198190 A1 | 8/2007 | Bauer et al. | |
| 2008/0044061 A1* | 2/2008 | Hongo | B60R 1/00 382/104 |
| 2010/0007478 A1* | 1/2010 | Hahn | B62D 13/06 340/431 |
| 2010/0019565 A1* | 1/2010 | Broch | B60T 8/1708 303/7 |
| 2010/0070139 A1* | 3/2010 | Ohshima | B60R 1/00 701/42 |
| 2010/0171828 A1* | 7/2010 | Ishii | B60R 1/00 348/135 |
| 2011/0001825 A1* | 1/2011 | Hahn | B60R 1/00 348/148 |
| 2011/0080304 A1* | 4/2011 | Toledo | B62D 15/027 340/932.2 |
| 2011/0087406 A1* | 4/2011 | Barth | B62D 15/027 701/41 |
| 2012/0092190 A1* | 4/2012 | Stefik | G06Q 10/02 340/932.2 |
| 2012/0265434 A1* | 10/2012 | Woodard | G08G 1/144 701/423 |
| 2012/0284012 A1* | 11/2012 | Rodriguez | G06Q 30/06 704/1 |
| 2013/0158803 A1* | 6/2013 | Headley | B62D 15/028 701/41 |
| 2013/0222592 A1* | 8/2013 | Gieseke | G08G 1/04 348/148 |
| 2014/0005904 A1* | 1/2014 | Chong | G08G 1/168 701/70 |
| 2014/0176348 A1* | 6/2014 | Acker, Jr. | G08G 1/144 340/932.2 |
| 2014/0249742 A1* | 9/2014 | Krivacic | G08G 1/14 701/400 |
| 2014/0266805 A1* | 9/2014 | Tippelhofer | G08G 1/143 340/932.2 |
| 2014/0375804 A1* | 12/2014 | Bulan | H04N 7/18 348/148 |
| 2015/0127208 A1 | 5/2015 | Jecker et al. | |
| 2015/0161890 A1* | 6/2015 | Huntzicker | G08G 1/144 340/932.2 |
| 2016/0185389 A1* | 6/2016 | Ishijima | B62D 15/0285 701/41 |
| 2016/0196747 A1* | 7/2016 | Tsyrklevich | G08G 1/143 701/532 |

FOREIGN PATENT DOCUMENTS

| | | | |
|---|---|---|---|
| DE | 102006056408 A1 | 6/2008 | |
| DE | 102007032720 A1 | 1/2009 | |
| DE | 102010008324 A1 | 8/2011 | |
| DE | 102012007986 A1 | 10/2013 | |
| EP | 2011701 A1 | 1/2009 | |
| EP | 2607210 A2 | 6/2013 | |
| JP | 2005018316 A * | 1/2005 | |
| JP | 2010215025 A * | 9/2010 | ............. B60K 35/00 |
| WO | WO-2008114271 A1 * | 9/2008 | ............ G07F 17/246 |
| WO | WO 2013/003866 A2 | 1/2013 | |

OTHER PUBLICATIONS

English-language abstract of German Patent Appliction Publication No. 10 2005 045 196 A1, published Sep. 28, 2006; 2 pages.

English-language abstract of German Patent Appliction Publication No. 10 2006 056 408 A1, published Jun. 19, 2008; 2 pages.

English-language abstract of German Patent Application 10 2007 032 720 A1, published Jan. 15, 2009; 1 page.

English-language abstract of German Patent Application Publication No. 10 2007 032 466 A1, published Mar. 15, 2007; 1 page.

International Preliminary Report on Patentability directed related International Patent Application No. PCT/EP2014/003400, dated Aug. 18, 2016, with attached English-language translation; 12 pages.

Internatonal Preliminary Report on Patentability directed to related International Patent Application No. PCT/EP2014/003400, dated May 12, 2015, with attached English-language translation; 7 pages.

Written Opinion of International Search Authority directed to related International Patent Application No. PCT/EP2014/003400, dated May 12, 2015, with attached English-language translation; 11 pages.

First Written Opinion of International Preliminary Examination directed to related International Patent Application No. PCT/EP2014/003400, dated Oct. 13, 2015, with attached English-language translation; 11 pages.

Second Written Opinion of International Preliminary Examination directed to related International Patent Application No. PCT/EP2014/003400, dated Mar. 24, 2016, with attached English-language translation; 12 pages.

* cited by examiner

METHOD AND DEVICE FOR STEERING A CAR/TRAILER COMBINATION INTO A PARKING SPACE

TECHNICAL FIELD

The present invention concerns a method for steering a car/trailer combination with a vehicle and at least one trailer, wherein the vehicle is steered by a user with the help of a mobile display unit, i.e., it is remotely controlled. Moreover, the present invention concerns a corresponding device with a mobile display unit.

BACKGROUND

Accidents often occur when maneuvering with car/trailer combinations, especially those of larger size with several trailers, since the driver's view of the overall rig is often hampered. Therefore, devices and methods are needed which afford the driver a better overview of the rig and, thus, a safe steering of the rig.

In German publication DE 10 2010 008 324 A1 a device is described made up of a combination of a motor vehicle and a mobile device independent of the motor vehicle with a processor and a camera. It is specified that the camera is aimed from the motor vehicle at a trailer suspended from the motor vehicle, so that the images of the trailer taken by the camera are evaluated by the processor in order to ascertain a positional relation between the motor vehicle and the trailer.

Publication DE 10 2005 045 196 A1 on the other hand concerns a device for assisting the driver of a tractor vehicle during rear maneuvers with a rig combination, comprising the following components: a camera mounted in the rear area of the vehicle, a steering angle sensor, a bending angle sensor, a simulation computer and a display device. The device is used to represent a trajectory of at least one impact point of a trailer of the rig, wherein the trajectory is calculated from at least one wheel lock angle and/or a bending angle and superimposed on a camera image.

In publication DE 10 2006 056 408 A1 a method is disclosed for determining a position of a two-axle trailer with at least one movable wheel axle, relative to a vehicle. The method comprises the following steps: generating of image data, detection of measurement points, determination of a position of each measurement point, determination of a disposition angle between a longitudinal axis of a tractor vehicle and a steering axis of the trailer and a disposition angle between the steering axis and a longitudinal axis of the trailer by means of the measurement points with respect to an image recording device.

SUMMARY

Against this background, a method is proposed for the steering of a car/trailer combination with a vehicle and at least one trailer in which a mobile display unit is used for representing at least a part of the car/trailer combination, wherein the mobile display unit is in contact with the vehicle via a wireless connection and is used to monitor driving functions of the vehicle, and wherein at least one orientation aid is additionally depicted on the mobile display unit.

In order to control a car/trailer combination during a critical driving maneuver, such as a parking process, in a way better than is possible from a driver's cabin, the method according to the invention calls for a mobile display unit, by means of which a particular driver of a rig or of a vehicle which is part of the rig, such as a truck, can monitor the rig from outside the vehicle and thus from a point where an overview of critical spots of the rig is possible.

For the monitoring of the rig by means of the mobile display device, the vehicle is switched to a corresponding monitor mode, which activates a vehicle control software which operates all necessary control elements of the vehicle in dependence on control signals of the mobile display unit.

Once the vehicle has been switched to the monitor mode, it is possible for the particular driver of the vehicle to leave the vehicle and pace off or inspect areas which cannot be seen from the driver's cabin. In parallel with this, the driver can monitor the vehicle via the mobile display device, so that the driver can monitor the vehicle for example while standing behind the vehicle or from any other position outside the vehicle.

By the term "monitoring" in the context of the present disclosure is meant both a viewing and checking of the current scenario in which the vehicle finds itself and an actuating, i.e., a remote steering of the vehicle, such as a maneuvering of the vehicle and/or the trailer coupled to it and/or the rig combination.

In order to facilitate the navigation of the vehicle for the driver in particular surroundings, it is specified that an image of at least a portion of the rig is depicted on the mobile display unit. As a rule, a portion of the vehicle and a tow bar of the trailer pointing toward the vehicle are represented at least for a section, and also possibly only schematically. The camera or other sensors used to create the image is generally disposed on the vehicle which is pulling the trailer, i.e., on the tractor vehicle. The image can be created for example by means of a camera or through suitable sensors, such as radar sensors, optical sensors, or any other technically suitable type of sensor. The image created by the sensors shows on the one hand at least one part of the rig and on the other hand at least one orientation aid, as well as optionally at least one portion of the respective surroundings of the rig.

Especially in municipal areas, many distracting elements may be found in a camera image, which impede a navigation or orientation of the driver. By a superimposing of orientation aids and/or parts of the surroundings, a navigation such as for parking a rig can be substantially facilitated.

Moreover, it is provided that the present invention serves in particular for use in a car or a car/trailer combination.

In another possible embodiment of the method according to the invention, the surroundings and the at least one portion of the car/trailer combination are represented in at least one type of representation of the following list of types of representation on the mobile display unit: TopView graphics, BowlView graphics, 3D-camera graphics, camera graphics and a model view.

It is conceivable for the mobile display unit to show an abstract image of the surroundings or the rig, i.e., one reduced to essential features, such as in a model view. Other advantageous forms of representation are 3D views, in which three-dimensional hazards are especially well detected, and a so-called "TopView graphics", in which a rig is represented from above, i.e., in a top view. A "BowlView graphics", on the other hand, makes it possible to represent even very long regions by a curvature of the representation on a display area.

By a model view in the context of the present invention is meant a schematic representation in which particular elements, that is, both at least a portion of the rig and also respective surroundings or orientation aids, are shown reduced for good comprehension, e.g., by lines and/or arrows.

The respective representation can be produced either by the respective sensor itself, a computing unit comprised by the sensor, an additional computing unit or the mobile display unit, so that even data which is not abstract can be converted into an abstract view in which the driver has an improved overview or orientation for the navigation of the vehicle or rig.

Another possibility of improving the overview of the driver on the mobile display unit or for the orientation and navigation in the particular surroundings of the rig is provided by orientation aids in the form of geometrical aids and/or superimposed features, such as help lines, help surfaces and/or optical highlighting, such as spacers. For example, by representing a trajectory suitable to a current control command, i.e., an anticipated movement process of the rig, the driver can assess whether the rig is in danger of colliding with the surroundings.

Moreover, it is possible for the driver at all times to initiate an emergency braking by which the rig is brought to a standstill as soon as possible. The emergency braking can occur, for example, by a specially provided operator element or a loss of contact with an operator's interface of the mobile display unit. Loss of contact with an operator's interface of the mobile display unit means that the driver, who can monitor, i.e., actuate the vehicle through the operator's interface of the mobile display unit, deliberately or unintentionally breaks contact with the operator's interface, which automatically signals that the actuating of the vehicle is ended or at least temporarily interrupted or halted.

In another possible configuration of the method according to the invention, the mobile display unit is a smartphone.

A smartphone offers all necessary preconditions for use as a mobile display unit for the method according to the invention. Besides an operator's interface, such as a touch screen, which can be used at the same time for displaying the sensor data, a smartphone also generally provides a powerful processor for the processing of the sensor data and the control commands of the user. Moreover, a smartphone offers means for sending and receiving of data for the monitoring of the vehicle, such as a 3G, LTA, WLAN or Bluetooth interface. Accordingly, it is advisable to provide the present method to a driver in an application for the configuring of a smartphone.

Of course, it is also conceivable to use a device which is at least equivalent to the aforementioned properties of a smartphone and which can be used to implement the method according to the invention.

In another possible configuration of the method according to the invention, the orientation aid comprises at least one geometrical indication regarding the vehicle and/or the trailer from the following list of geometrical indications regarding the vehicle and/or the trailer: actual angle, i.e., a current angle of a longitudinal axis of the vehicle and/or the trailer, nominal angle, i.e., an angle which is required in order to travel a predetermined movement path, maximum angle, i.e., the largest possible steering angle of the vehicle, current turning range, i.e., a range which is covered by the vehicle for a current steering angle of the vehicle, current braking distance or stopping distance, current wheel position, for example in degrees, bend angle, i.e., the difference between the respective actual angles of vehicle and trailer, an optical axis of a camera, which can be permanently indicated or built into the camera, a perpendicular for orientation with respect to a reference point and a current turn radius which the car/trailer combination needs for a current steering angle, as well as a trajectory of at least one receptor point of the trailer. It is conceivable that the driver can optionally show or hide respective geometrical indications and/or a representation of the current surroundings of the rig.

In another possible configuration of the method according to the invention, a recording of a sensor arranged on the rig is represented on the display unit.

An arrangement of sensors, especially cameras, on the rig and especially on the vehicle generally affords a good overview, thanks to an elevated position. Of course, other positions for the arrangement of respective sensors on and underneath the rig as well as on its side surfaces are also conceivable.

In another possible configuration of the method according to the invention, the mobile display unit is connected to the vehicle via a vehicle control software.

While it is possible by means of the method according to the invention for the driver to steer, i.e., drive the vehicle itself, for example via a joystick, a touch screen, or another suitable input method, it is likewise conceivable for the vehicle or the rig to be automatically steered by a vehicle control software and for the driver to merely carry out a monitoring function. The vehicle control software can be executed both on the mobile display unit and on a computer unit comprised in the particular vehicle. The vehicle control software is connected to respective actuators and/or control elements and it regulates corresponding systems of the vehicle or the rig so that a driving maneuver desired by the driver is carried out.

In another possible embodiment of the method according to the invention, surfaces which will be swept by the at least part of the car/trailer combination are graphically highlighted on the mobile display unit. In order to better assess a maneuvering range of the rig, it is advantageous for surfaces currently swept by the rig in the present surroundings to be graphically highlighted on the mobile display unit, e.g., by being colored.

In another possible embodiment of the method according to the invention, surfaces which will be swept by the at least part of the car/trailer combination upon continuation of a current trajectory of the car/trailer combination are graphically highlighted on the mobile display unit.

In order to better estimate the maneuvering range of the rig, it is furthermore advantageous to graphically highlight, e.g., by coloring, surfaces which will be swept in future by the rig, i.e., upon continuation of the present control signals in the particular surroundings.

In another possible embodiment of the method according to the invention, a trajectory is selected by the user with the mobile display unit and the trajectory is automatically driven by the rig, after consent is given by the user.

By means of the vehicle control software in combination with the mobile display unit, the driver can compose a particular trajectory, judge its dangers or its maneuvering path, and then automatically execute it. In this, the driver has a monitoring function and can optionally judge, from outside the vehicle, whether a current driving maneuver is permissible or whether the driving maneuver should be ended by initiating an emergency braking.

In another possible embodiment of the method according to the invention, the respective surroundings of the car/trailer combination are detected during a drive-by of the rig at the respective surroundings and respective possible parking spaces for the rig are graphically highlighted on the mobile display unit, and the user can select a respective parking space and the rig after the user's consent is driven automatically into the selected parking space.

Since a vehicle generally at first drives by a parking space before driving into it, the drive-by can be utilized to detect the parking space by suitable sensors and employ sensor data collected in this way for a representation of the parking space and/or to carry out the method according to the invention. Once a particular parking space has been detected, the driver can judge it on the mobile display unit and possibly initiate a parking process, i.e., an automatic driving maneuver to take up the parking space. The driver can be located, e.g., outside the vehicle at a position with a good overview of the parking space.

In another possible embodiment of the method according to the invention, a protective braking occurs in one instance of the following list of instances: unclear communication situation, hazardous conditions, potential collision of the car/trailer combination with the surroundings, loss of communication between the vehicle and the mobile display unit, implausible sensor signal, at least one geometrical indication outside a control range, and absence of a control signal from the mobile display unit.

Especially during automatic driving maneuvers a safe operation of a vehicle is only possible if the driver is inspecting, i.e., monitoring the executed driving maneuvers. For this purpose, it is proposed that an emergency braking is performed in cases where a monitoring by the driver is limited and/or doubtful, bringing the vehicle or the rig to a standstill as soon as possible.

Moreover, the present invention comprises a device for steering a rig comprising a vehicle and at least one trailer with a mobile display unit, which is configured to steer the rig so that the vehicle drives into a parking space being represented on a mobile display unit, wherein the mobile display unit is furthermore configured to display to the user a graphics of at least a portion of the rig and at least one orientation aid for navigation in the surroundings.

In the device according to the invention, control signals are generated by a user, i.e., a driver of a particular vehicle or rig, on a mobile display unit, and these are relayed via a sending/receiving unit to the vehicle or a sending/receiving unit comprised in the vehicle. The control signals can be analyzed by a vehicle control software, which can be implemented both on the mobile display unit and on a computer unit comprised in the vehicle, and used for the automatic steering of the vehicle or rig. Sensor data ascertained by sensors comprised in the vehicle or rig is relayed to the mobile display unit and depicted on the mobile display unit. Moreover, it is possible to show orientation aids in the representation of the sensor data, which can either be determined, i.e., computed or measured, or permanently indicated in the representation, so that the driver has an easier orientation within the representation.

Advantageously, the possible trajectories or movement processes, i.e., those suitable to a position of the vehicle or rig, are presented to the driver for orientation, and the driver himself can decide between them.

In another possible embodiment of the method according to the invention, the mobile display unit is configured so that the parking space being represented on the mobile display unit is to be selected by a user in the respective surroundings being represented on the mobile display unit and the vehicle drives automatically into the parking space upon selection by the user.

It is conceivable that the user of the mobile display unit or the driver of the vehicle or rig will select a parking space represented on the mobile display unit via a user interface, such as a touch screen, for example by dragging the representation of the rig to the representation of the parking space, whereupon the vehicle or rig automatically drives into the selected parking space, i.e., making use of the vehicle control software as well as any available sensors.

Further benefits and configurations of the invention will emerge from the description and the enclosed drawing.

Of course, the above mentioned and the following explained features can be used not only in the particular indicated combination, but also in other combinations or standing alone, without leaving the scope of the present invention.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The invention is depicted schematically by means of embodiments in the drawings and shall be schematically described at length with reference to the drawings.

DETAILED DESCRIPTION

Figure 1:
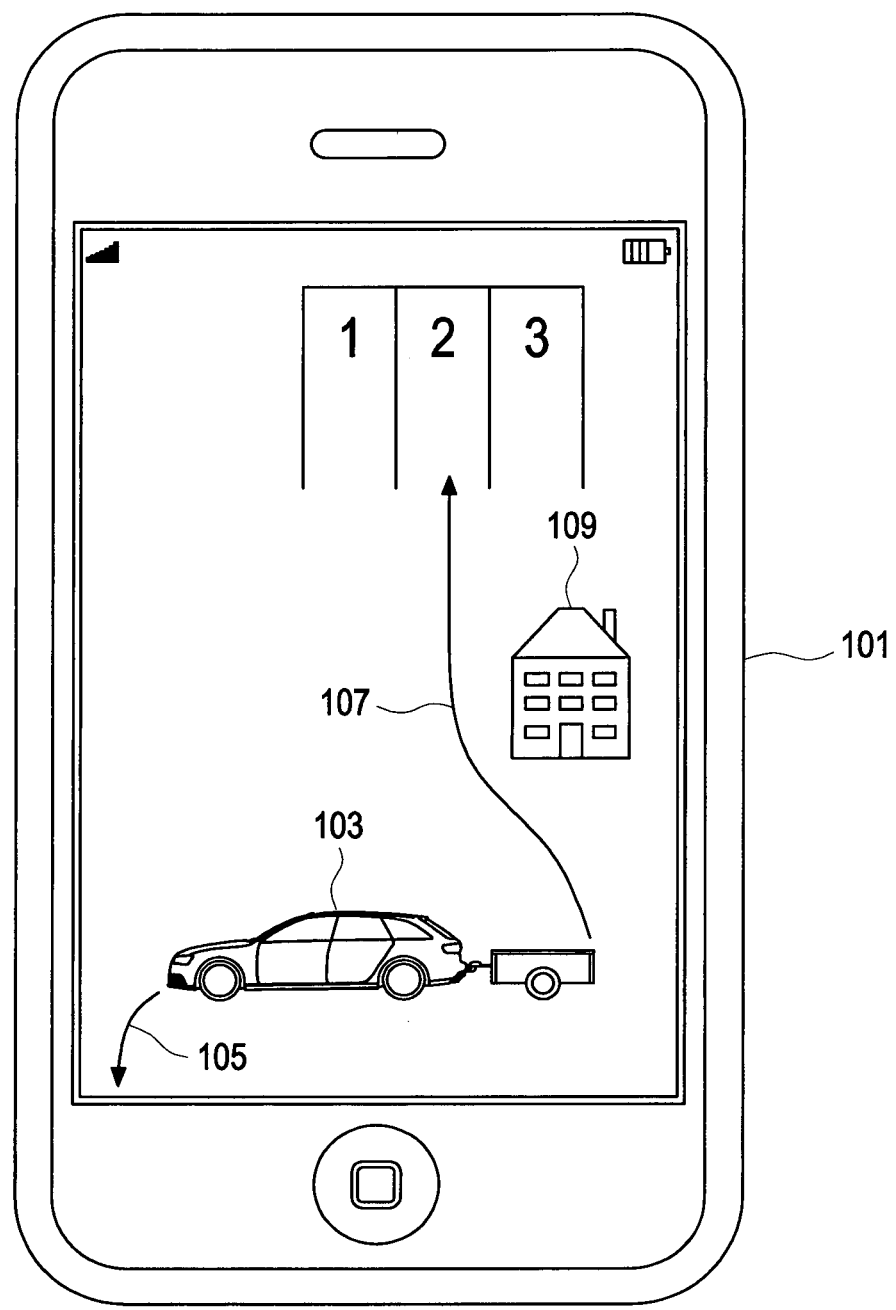
FIG. 1 shows a possible representation on one embodiment of the mobile display unit according to the invention, where a smartphone is chosen as the mobile display unit.

The representation shown on a mobile display unit 101 in FIG. 1 comprises a rig which is supposed to drive into a parking space 2. For this, the respective driver of the rig 103 selects the parking space 2 on the mobile display unit 101 by touching a corresponding spot on the mobile display unit 101. The driver is then proposed one possible trajectory resulting in the driving of the rig 103 into the parking space 2, as illustrated by the arrows 105 and 107. Based on a preceding drive-by of a potential obstacle 109 in the form of a house, which was detected by sensors of the rig 103 during the drive-by, the driver is proposed a trajectory which moves past the house 109 at a safe distance.

In order to execute the driving into the parking space 2 per the proposed trajectory, the driver confirms the trajectory by moving the representation of the rig 103 into the parking space 2 using drag and drop, whereupon the rig 103 automatically drives into the parking space 2. During the entire movement of the rig 103, the driver keeps at least one finger on the mobile display unit 101 or on a touch screen comprised in the mobile display unit 101, whereby the latter is informed that the driver is actively performing his monitoring duties. As soon as the driver removes his finger from the touch screen, the rig 103 performs an emergency braking, resulting in the fastest possible halting of the rig 103.

Figure 2:
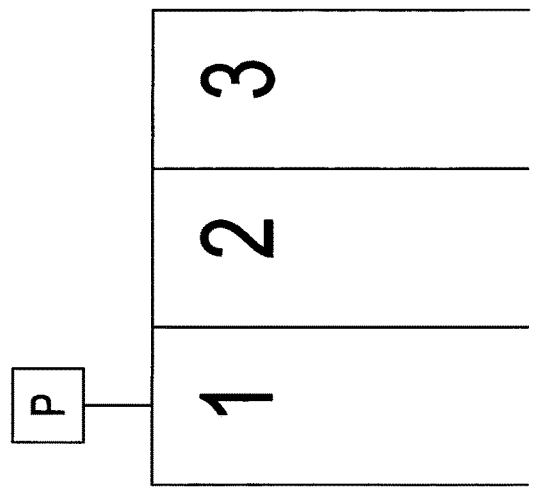
FIG. 2 shows a schematic representation of one possible embodiment of a connection between the mobile display unit of FIG. 1 and a vehicle.
Figure 2:
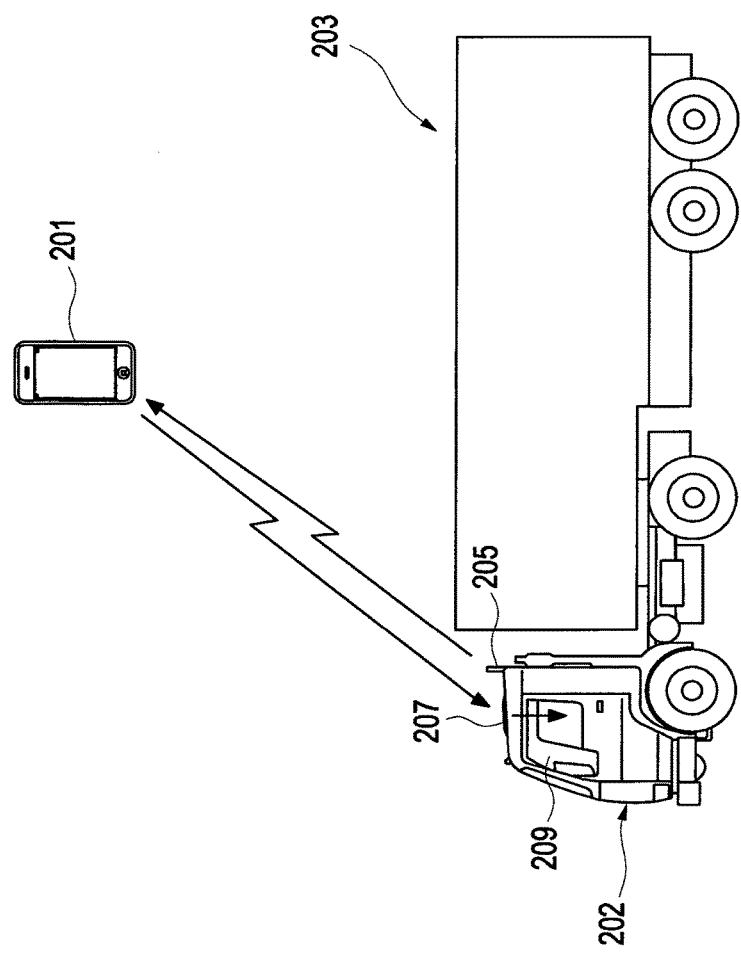

The arrangement shown in FIG. 2 comprises a rig 203, which is in communication with a smartphone 201, wherein the smartphone 201 in turn is in communication with a camera 205, comprised in a vehicle 202 of the rig 203. In order to steer the rig 203 into a parking space 2, the driver of the rig 203 makes use of the smartphone 201 from outside the rig 203 in order to gain an overview of the respective surroundings and avoid a potential collision of the rig 203 with objects or persons possibly present in an area visible only partly or not at all from the driver's cabin 209. For this, commands entered into the smartphone 201 are sent to a receiving unit 207 comprised in the vehicle 209 and relayed from the receiving unit 207 to a vehicle control software for control of the vehicle 202.

For this, the driver is shown a model view of the rig 203 on the smartphone 201. By a touch screen comprised in the smartphone 203, the driver drags slowly and carefully the model view on the rig on the smartphone 201 into a representation of the parking space 2. In parallel with this, the rig 203 is set in motion, the rig 203 behaving in accordance with the representation of the rig on the smartphone, i.e., the rig 203 stops when the driver stops his finger and the representation of the rig likewise stops. Conversely, the rig 203 is set in motion when the driver moves his finger and the representation of the rig moves in the virtual representation. By constant movement of the driver around the rig 203, it is possible for the driver to pace out all potential danger zones while the rig 203 is moving. In this way, it is possible for the driver to drive safely and by himself even in areas which are hard to see or dangerous areas such as those on school grounds.

Moreover, in the event that the vehicle 202 is performing abrupt turning movements during backward maneuvering and the driver is off to the side behind the rig 203 and does not see a possible collision of the vehicle 202 with an obstacle, it is provided that a trajectory represented on the smartphone 201 and/or executed by the vehicle 202 is actively, i.e., automatically changed. In this way, the obstacle is automatically driven around and a collision with the vehicle 202 is avoided. After the successful detour, the original trajectory is resumed once more.

Figure 3:
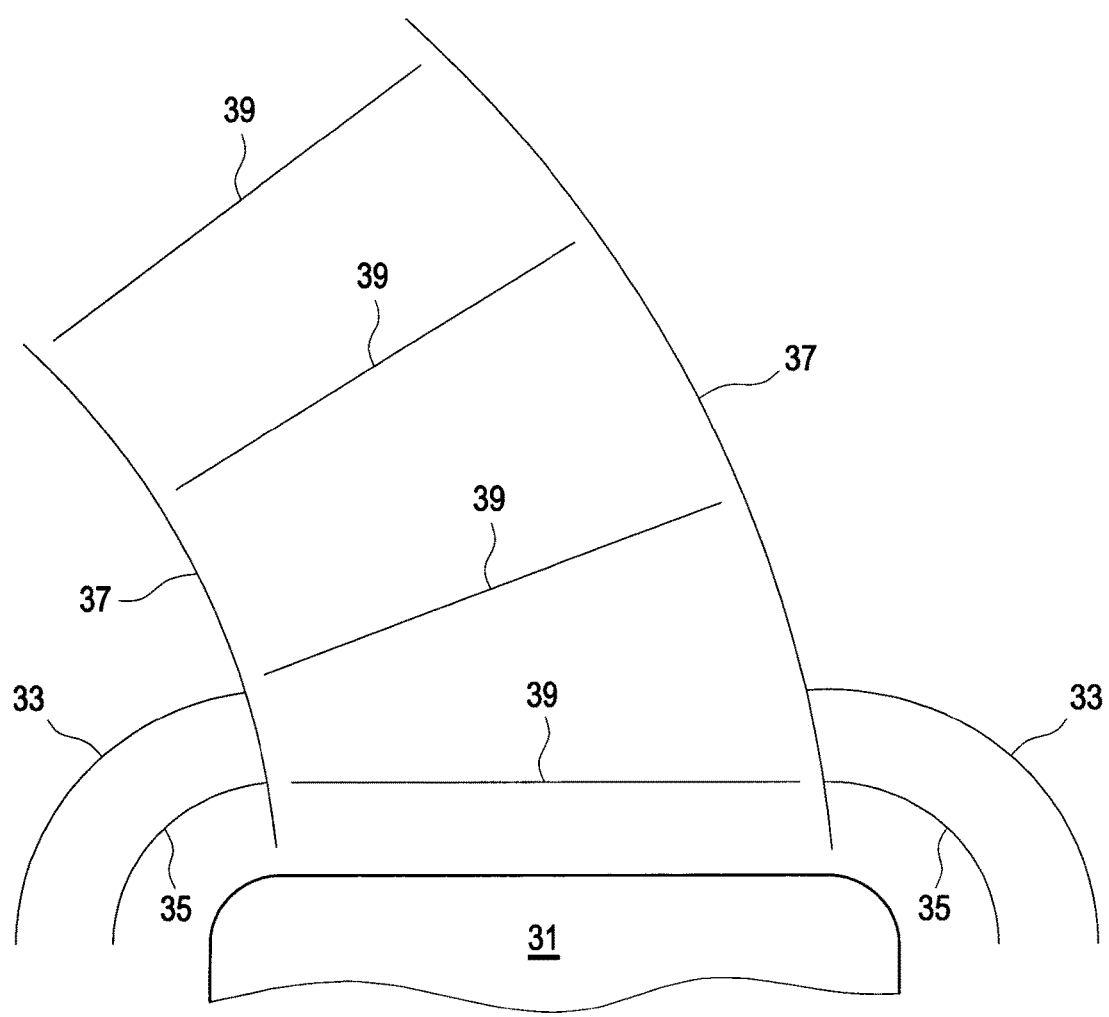
FIG. 3 shows a schematic representation of one possible embodiment of a display on the mobile display unit.

The view represented in FIG. 3 shows a view for the navigation or steering of a vehicle. A rear perspective from a tailgate of the vehicle is shown. An edge 31 of the trunk forms an end of the vehicle, being bordered by zones 33, 35 of different color, so that in event of an overlapping of one of the zones 33 and/or 35 with a potentially colliding component in the surroundings a warning is given, e.g., in the form of a blinking on the mobile display unit.

Furthermore, orientation aids 37 and 39 are represented on the mobile display unit, which are superimposed on a recording of the respective surroundings provided by a camera sensor. The curved orientation aids 37 show a movement path of outer boundaries of the vehicle or rig which is anticipated for a present steering angle. On the other hand, the orientation aids 39 are suitable for judging a distance to be traveled and can be used as a reference in judging the size of an object or surface located in the surroundings, such as a parking space.

By using the mobile display unit, it is possible for the user to foresee a movement path of the particular vehicle or rig and to respond in good time to possibly arising dangers, both by the view represented in FIG. 3 and by independently pacing off and viewing the respective surroundings.

The invention claimed is:

1. A method for steering a car/trailer combination, comprising:
depicting at least a portion of the car/trailer combination on a mobile display unit, wherein the mobile display unit is in communication with a car of the car/trailer combination via a wireless connection, the mobile display unit monitors driving functions of the car of the car/trailer combination, and the mobile display unit comprises a smartphone;
depicting an orientation aid on the mobile display unit;
detecting a current surrounding of the car/trailer combination during a drive-by;
graphically highlighting a possible parking space for the car/trailer combination on the mobile display unit;
receiving a parking space selection from a user at the mobile display unit; and
driving the car of the car/trailer combination into the selected parking space, wherein the driving the car of the car/trailer combination into the selected parking space is performed automatically.

2. The method of claim 1, wherein the depicting the orientation aid further comprises:
depicting the orientation aid together with at least a portion of the current surrounding of the car/trailer combination on the mobile display unit for a navigation of the car/trailer combination in the current surrounding.

3. The method of claim 2, wherein the orientation aid comprises a geometrical indication selected from a group comprising:
an actual angle of the car of the car/trailer combination, a nominal angle of the car/trailer combination, a maximum angle of the car of the car/trailer combination, a current turning range of the car of the car/trailer combination, a current braking distance of the car/trailer combination, a wheel position of the car of the car/trailer combination, a bend angle between the car of the car/trailer combination and a trailer of the car/trailer combination, an optical axis of a camera, a current turn radius of the car/trailer combination, a perpendicular for orientation based on a reference point and the current turn radius of the car/trailer combination, and a trajectory of a receptor point of the trailer of the car/trailer combination.

4. The method of claim 1, further comprising:
depicting a recording of a sensor arranged on the car/trailer combination on the mobile display unit.

5. The method of claim 1, wherein the mobile display unit is in communication with the car of the car/trailer combination via vehicle control software.

6. The method of claim 1, wherein at least one of:
the depicting the portion of the car/trailer combination on the mobile display unit, and
the depicting the orientation aid on the mobile display unit,
are depicted using at least one of TopView graphics, BowlView graphics, 3D-camera graphics, camera graphics or a model view.

7. The method of claim 1, further comprising:
graphically highlighting a surface swept by the portion of the car/trailer combination.

8. The method of claim 1, further comprising:
graphically highlighting a surface which will be swept by the car/trailer combination based on a current trajectory of the car/trailer combination.

9. The method of claim 1, further comprising:
receiving a user-selected trajectory from the mobile display unit; and
automatically driving the car/trailer combination on the user-selected trajectory.

10. The method of claim 1, further comprising:
braking upon an occurrence of at least one of an unclear communication situation, a hazardous condition, a potential collision of the car/trailer combination with the surrounding, a loss of communication between the car of the car/trailer combination and the mobile display unit, an implausible sensor signal, a geometrical indication outside a control range, or an absence of a control signal from the mobile display unit.

11. The method of claim 1, wherein the driving the car of the car/trailer combination into the selected parking space further comprises:
issuing a command from the mobile display unit to the car of the car/trailer combination, wherein the command causes the car of the car/trailer combination to drive into the selected parking space.

12. The method of claim 1, wherein the orientation aid comprises a geometrical indication for the car of the car/trailer combination or the trailer of the car/trailer combination.

13. The method of claim 1, wherein the driving the car of the car/trailer combination into the selected parking space further comprises:
issuing an emergency brake command from the mobile display unit to the car of the car/trailer combination in response to a loss of contact of the user with the mobile display unit, wherein the emergency brake command causes the car of the car/trailer combination to brake.

14. The method of claim 1, wherein the driving the car of the car/trailer combination into the selected parking space further comprises:
issuing a command from the mobile display unit to the car of the car/trailer combination based on the car of the car/trailer combination being in a monitoring mode, wherein the command causes the car of the car/trailer combination to drive into the selected parking space, and the car of the car/trailer combination being in the monitoring mode enables the user to monitor the driving of the car of the car/trailer combination into the selected parking space outside of the car of the car/trailer combination.

15. The method of claim 1, wherein the driving the car of the car/trailer combination into the selected parking space further comprises:
driving the car of the car/trailer combination into the selected parking space in response to the user maintaining verifiable contact with the mobile display unit.

16. The method of claim 1, wherein the driving the car of the car/trailer combination into the selected parking space further comprises:
issuing an emergency brake command from the mobile display unit to the car of the car/trailer combination in response to the user failing to maintain verifiable contact with the mobile display unit, wherein the user failing to maintain verifiable contact with the mobile display unit comprises the user breaking physical contact with an operator user interface of the mobile display unit, and wherein the emergency brake command causes the car of the car/trailer combination to brake.

17. A device for steering a car/trailer combination, comprising:
a mobile display unit, wherein the mobile display unit is configured to:
steer the car/trailer combination via a wireless connection such that the car/trailer combination moves in accordance with instructions provided by the mobile display unit;
display a graphical representation of at least a portion of the car/trailer combination and an orientation aid for navigating a current surrounding of the car/trailer combination;
display a graphical representation of a parking space located in the current surrounding of the car/trailer combination; and
receive a user selection of the parking space, wherein the car of the car/trailer combination automatically drives into the selected parking space in response to receiving the user selection,
wherein the mobile display unit comprises a smartphone.

18. The device of claim 17, wherein the mobile display unit is further configured to:
issue a command to the car of the car/trailer combination in response to receiving the user selection, wherein the command causes the car of the car/trailer combination to drive into the selected parking space.

19. The device of claim 17, wherein the orientation aid comprises a geometrical indication selected from a group comprising:
an actual angle of the car of the car/trailer combination, a nominal angle of the car/trailer combination, a maximum angle of the car of the car/trailer combination, a current turning range of the car of the car/trailer combination, a current braking distance of the car/trailer combination, a wheel position of the car of the car/trailer combination, a bend angle between the car of the car/trailer combination and a trailer of the car/trailer combination, an optical axis of a camera, a current turn radius of the car/trailer combination, a perpendicular for orientation based on a reference point and the current turn radius of the car/trailer combination, and a trajectory of a receptor point of the trailer of the car/trailer combination.

20. The device of claim 17, wherein the orientation aid comprises a geometrical indication for the car of the car/trailer combination or the trailer of the car/trailer combination.

21. The device of claim 17, wherein the mobile display unit is further configured to:
issue an emergency brake command from the mobile display unit to the car of the car/trailer combination in response to a loss of contact of a user with the mobile display unit, wherein the emergency brake command causes the car of the car/trailer combination to brake.

* * * * *